United States Patent
Wakabayashi et al.

(10) Patent No.: US 11,859,346 B2
(45) Date of Patent: Jan. 2, 2024

(54) FORMED BODY PRODUCING METHOD

(71) Applicant: SEIKO EPSON CORPORATION, Tokyo (JP)

(72) Inventors: Shigemi Wakabayashi, Nagano (JP); Masahiko Nakazawa, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/809,031

(22) Filed: Jun. 27, 2022

(65) Prior Publication Data

US 2022/0412007 A1   Dec. 29, 2022

(30) Foreign Application Priority Data

Jun. 29, 2021 (JP) ................. 2021-107744

(51) Int. Cl.
*D21H 17/28* (2006.01)
*D21F 1/08* (2006.01)
*D21H 25/04* (2006.01)

(52) U.S. Cl.
CPC ............... *D21H 17/28* (2013.01); *D21F 1/08* (2013.01); *D21H 25/04* (2013.01)

(58) Field of Classification Search
CPC .......... D21H 17/28; D21H 25/04; D21F 1/08
USPC ...................................................... 162/175
See application file for complete search history.

(56) References Cited

U.S. PATENT DOCUMENTS

| | | |
|---|---|---|
| 2016/0332325 A1 | 11/2016 | Murayama et al. |
| 2019/0352851 A1 | 11/2019 | Kemper et al. |
| 2021/0301106 A1 | 9/2021 | Yokokawa et al. |

FOREIGN PATENT DOCUMENTS

| | | |
|---|---|---|
| CN | 106062267 A | 10/2016 |
| CN | 110088396 A | 8/2019 |
| JP | H05-246465 A | 9/1993 |

*Primary Examiner* — Mark Halpern
(74) *Attorney, Agent, or Firm* — Global IP Counselors, LLP

(57) ABSTRACT

A formed body producing method including an accumulating step of accumulating a mixture including fiber and starch, a humidifying step of providing the accumulated mixture with water, and a forming step of obtaining a formed body by heating and pressurizing the mixture provided with water, wherein a gelatinization temperature of the starch is 60° C. or lower.

7 Claims, 2 Drawing Sheets

FORMED BODY PRODUCING METHOD

The present application is based on, and claims priority from JP Application Serial Number 2021-107744, filed Jun. 29, 2021, the disclosure of which is hereby incorporated by reference herein in its entirety.

BACKGROUND

1. Technical Field

The present disclosure relates to a formed body producing method.

2. Related Art

A formed body producing method in which a formed body is produced by adding atomized water to a cotton-like material produced by defibrating waste paper and by further adding a powdery or granular sizing agent is proposed (refer to, for example, JP-A-5-246465) as a method for producing a formed body such as a cushioning material by recycling waste paper without using a large amount of water in contrast to a sheet forming method. Since such a formed body producing method can produce a formed body by using a small amount of water compared with the sheet forming method, there is an advantage in saving energy and time spent on dehydration, drying, and the like.

However, in the above-described formed body producing method, it is difficult to obtain strong mutual binding of fiber by simply mixing the sizing agent with the fiber, and it may be difficult to sufficiently ensure strength of the resulting formed body. In particular, when a formed body is produced by providing a small amount of water to a mixture of the fiber and a sizing agent, a region in which mutual binding of the fiber is strong and a region in which mutual binding of the fiber is weak may be generated, and there is a problem that the formed body may be damaged due to the region in which binding is weak serving as a starting point and the strength of the formed body deteriorates.

SUMMARY

A formed body producing method includes an accumulating step of accumulating a mixture including fiber and starch, a humidifying step of providing the accumulated mixture with water, and a forming step of obtaining a formed body by heating and pressurizing the mixture provided with water, wherein a gelatinization temperature of the starch is 60° C. or lower.

DESCRIPTION OF EXEMPLARY EMBODIMENTS

Figure 1:
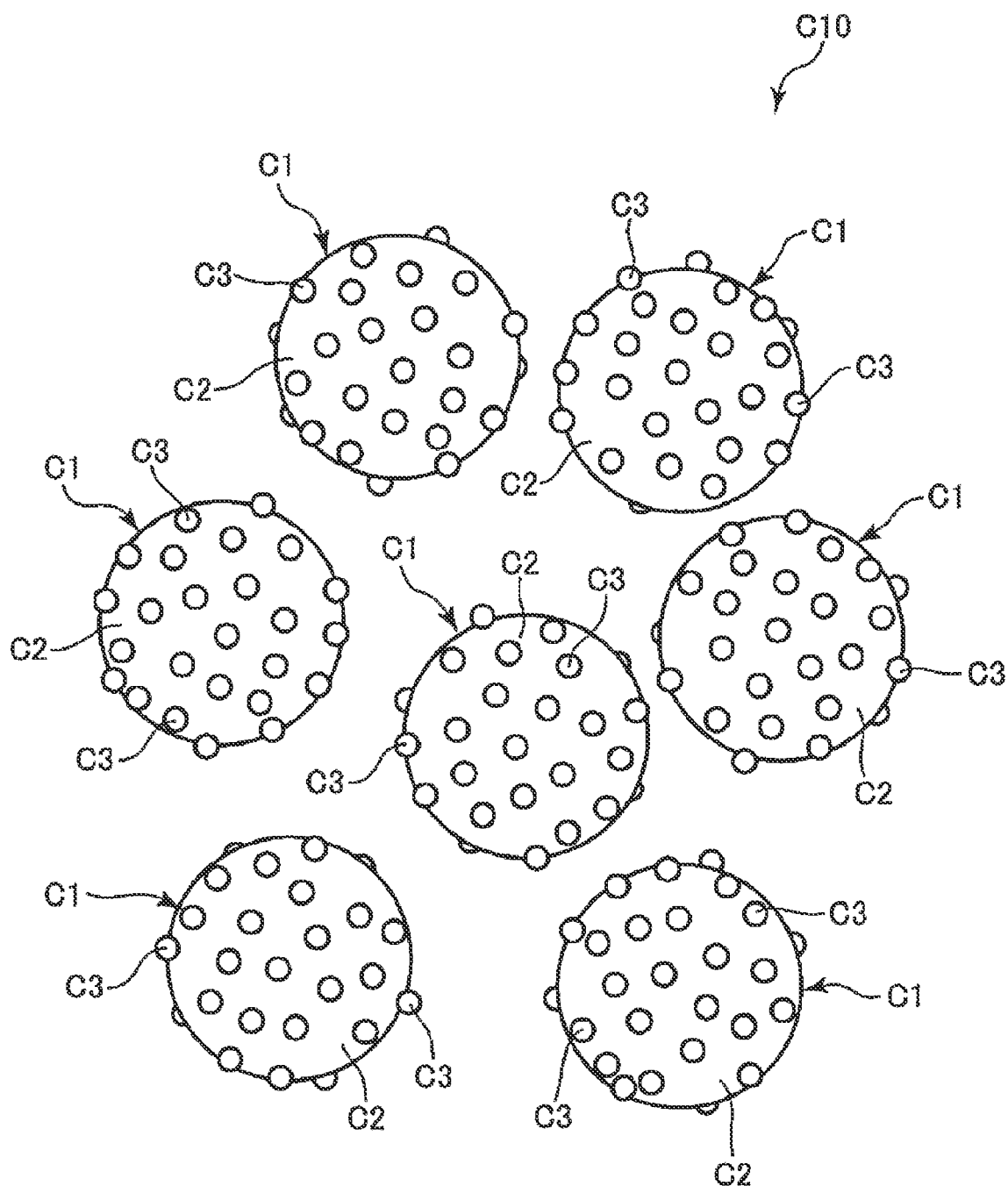
FIG. 1 is a schematic diagram illustrating a favorable embodiment of a binder used in the formed body producing method.

The favorable embodiment according to the present disclosure will be described below.

1. Formed Body Producing Method

Each step of the formed body producing method will be described below. To begin with, raw materials used for the formed body producing method will be described.

1.1. Raw Material

In the formed body producing method, fiber and starch serving as a binding material to bind the fiber are used as the raw materials.

1.1.1. Fiber

The fiber is a main component of a formed body produced by using the formed body producing method and is a component that largely contributes to shape retaining of the formed body and that has a large influence on the characteristics such as strength of the formed body.

The fiber may be composed of any material, and it is favorable that the material can maintain a fiber state in spite of heating in the forming step.

The fiber may be a synthetic fiber composed of a synthetic resin, such as a polypropylene, a polyester, and a polyurethane, and the fiber is favorably a fiber derived from a natural material, that is, a biomass-derived fiber, and more favorably a cellulose fiber.

Consequently, environmental problems, underground resource conservation, and the like can be more favorably addressed.

In particular, when the fiber is the cellulose fiber, the following effect is also obtained.

That is, the cellulose fiber is derived from plant and is an abundant natural material. Using the cellulose fiber as the fiber enables environmental problems, underground resource conservation, and the like to be further favorably addressed and is also favorable from the viewpoint of stable supply of the formed body, cost reduction, and the like. In addition, of various fibers, the cellulose fiber has particularly high theoretical strength and provides an advantage of further improving the strength of the formed body.

The cellulose fiber is usually mainly composed of cellulose and may contain components other than cellulose. Examples of such a component include hemicellulose and lignin.

It is favorable that the fiber be composed of a substance having a chemical structure of at least one of a hydroxy group, a carbonyl group, and an amino group.

Consequently, formation of a hydrogen bond between the fiber and the starch serving as the binding material to bind the fiber is facilitated, and the binding strength between the fiber and the starch can be made more excellent. Therefore, the strength of the entire formed body, for example, tensile strength and the like of a sheet-like formed body can be made more excellent.

In this regard, the cellulose fiber subjected to breaching treatment and the like may be used.

In addition, the fiber may be subjected to treatment, such as ultraviolet irradiation treatment, ozone treatment, or plasma treatment. Consequently, the hydrophilicity of the fiber can be enhanced, and the affinity for the starch serving as the binding material can be enhanced. More specifically, a functional group such as a hydroxy group can be introduced on the surface of the fiber by these treatments, and a hydrogen bond can be more effectively formed between the fiber and the starch.

There is no particular limitation regarding the average length of the fiber, and the average length is preferably 0.1 mm or more and 50.0 mm or less, more preferably 0.2 mm or more and 5.0 mm or less, and further preferably 0.3 mm or more and 3.0 mm or less.

Consequently, the resulting formed body can have more excellent shape stability, strength, and the like.

There is no particular limitation regarding the average thickness of the fiber, and the average thickness is preferably 0.005 mm or more and 0.500 mm or less and more preferably 0.010 mm or more and 0.050 mm or less.

Consequently, the resulting formed body can have more excellent shape stability, strength, and the like. In addition, unevenness of the surface of the formed body can be effectively prevented from reluctantly occurring.

There is no particular limitation regarding the average aspect ratio, that is, ratio of the average length to the average thickness, of the fiber, and the average aspect ratio is preferably 10 or more and 1,000 or less and more preferably 15 or more and 500 or less.

Consequently, the resulting formed body can have more excellent shape stability, strength, and the like. In addition, unevenness of the surface of the resulting formed body can be effectively prevented from reluctantly occurring.

1.1.2. Starch

The starch is used as a binding material to mutually bind the fiber. The starch is a polymer material in which a plurality of α-glucose molecules are polymerized by glucoside bonds. The starch contains at least one of amylose and amylopectin. Since the starch is a biomass-derived raw material, using the starch as the binding material enables environmental problems, underground resource conservation, and the like to be favorably addressed.

The gelatinization temperature of the starch is 60° C. or lower, preferably 55° C. or lower, and more preferably 52° C. or lower. The gelatinization temperature of the starch being within the above-described range enables the water absorbency of the starch serving as the binding material to be enhanced and enables the provided water to be promptly absorbed. Consequently, gelatinization of the starch favorably proceeds even at a relatively low temperature, and an excellent binding property can be exerted. That is, a formed body having sufficient strength can be produced.

In this regard, the gelatinization temperature of the starch is preferably 30° C. or higher and more preferably 40° C. or higher. Consequently, the starch can be suppressed from reluctantly gelatinizing inside the formed body producing apparatus. In particular, the gelatinization temperature of the starch being within the above-described range enables the starch to be suppressed from excessively absorbing water in a normal temperature environment. Consequently, the starch is suppressed from gelatinizing in a flow passage to supply the binder in the formed body producing apparatus. As a result, the binder can be stably supplied, and the fiber and the starch can be uniformly mixed. Therefore, the formed body having excellent strength can be produced. In addition, the productivity is excellent.

Regarding the natural starch serving as the raw material for the starch, for example, various plant-derived materials can be used. More specifically, for example, materials derived from grain, such as corn, wheat, and rice, beans, such as broad beans, mung beans, and adzuki beans, corm, such as potato, sweet potato, and tapioca, wild grass, such as bracken and vine, and palms such as sago palm, can be used.

The weight average molecular weight of the starch is preferably 50,000 or more and 400,000 or less, more preferably 70,000 or more and 300,000 or less, and further preferably 80,000 or more and 200,000 or less.

Consequently, the water absorption efficiency of the starch can be made more excellent, and further a formed body having sufficient strength can be produced. More specifically, even when the amount of water provided is small, gelatinization by heating favorably proceeds, the productivity of the formed body can be made excellent. Further, the strength of the produced formed body can be made excellent. In addition, regarding the starch having a weight average molecular weight within the above-described range, reluctant denaturing due to provision of water does not readily occur.

The starch having a weight average molecular weight within the above-described range has a small molecular weight compared with common starch. The starch having a value of the weight average molecular weight set to be within the above-described range, as described above, can be favorably obtained in the following manner, for example. The starch having a value of the weight average molecular weight set to be within a predetermined range can be obtained by, for example, suspending natural starch in water, and making sulfuric acid, hydrochloric acid, or sodium hypochlorite to act on the suspension under the condition in which the starch is not gelatinized. Alternatively, the starch having a value of the weight average molecular weight set to be within a predetermined range can be obtained by heating natural starch to 120° C. to 180° C. directly or after being mixed with a small amount of volatile acid, such as hydrochloric acid, diluted with water, sufficiently mixed, aged, and dried at low temperature. Alternatively, the starch having a value of the weight average molecular weight set to be within a predetermined range can be favorably obtained by, for example, subjecting a paste liquid that is the natural starch heated with water to hydrolysis treatment by an acid or an enzyme.

The weight average molecular weight of the starch can be determined based on the measurement by gel permeation chromatography. The weight average molecular weights described in examples later are also values determined based on the measurement by gel permeation chromatography.

As illustrated in FIG. 1, the starch is favorably a starch particle C2, and it is preferable that the starch particle C2 be integrated with the inorganic particle C3 and form the composite particle C1 described below.

The binder C10 includes the inorganic particle C3 and the starch particle C2 containing the starch, and the binder C10 includes the composite particle C1 in which the starch particle C2 and the inorganic particle C3 are integrated.

In this regard, in the present disclosure, a state in which at least a portion of the inorganic particle C3 attaches to the surface of the starch particle C2 or at least a portion of the inorganic particle C3 is included inside the starch particle C2 so as to form a composite particle C1 is denoted as "a composite particle C1 in which the starch particle C2 and the inorganic particle C3 are integrated". That is, it is not excluded that a starch particle C2 or an inorganic particle C3 not forming a composite particle C1 is included in the binder C10.

In the configuration illustrated in FIG. 1, regarding the composite particle C1 included in the binder C10, the inorganic particle C3 is attached to the surface of the starch particle C2.

Consequently, repulsive force is exerted between inorganic particles C3, and flocculation of composite particle C1 does not readily occur. In this regard, the arrangement of inorganic particles C3 can be examined by, for example, various electron microscopes.

The composite particle C1 favorably includes the starch particle C2 having an average particle diameter of 1.0 μm or more and 30.0 μm or less, more preferably includes the starch particle C2 having an average particle diameter of 3.0 μm or more and 20.0 μm or less, and further preferably includes the starch particle C2 having an average particle diameter of 5.0 μm or more and 15.0 μm or less.

Consequently, when a formed body is produced, the starch particle C2 contained in the binder C10 is smoothly provided with water, and the strength and the reliability of the resulting formed body can be made more excellent. In particular, when the starch particle C2 is a particle having an average particle diameter of 30.0 μm or less, the specific surface area of the starch particle C2, that is, the ratio of the surface area to the volume of the starch particle C2 increases, and the water absorption efficiency of the starch particle C2 becomes more excellent. As a result, even when the amount of water provided is small, a formed body having sufficient strength can be produced.

The composite particle C1 includes the inorganic particle C3.

The average particle diameter of the inorganic particle C3 is preferably 1.0 nm or more and 20.0 nm or less, more preferably 3.0 nm or more and 18.0 nm or less, and further preferably 5.0 nm or more and 10.0 nm or less.

Consequently, excessive unevenness of the surface of the composite particle C1 in which the inorganic particle C3 is attached to the surface of the starch particle C2 is favorably suppressed from occurring. As a result, when the binder C10 is mixed with the fiber, the fluidity of the composite particle C1 can be made more excellent, and the composite particle C1 can be more uniformly mixed with the fiber. In addition, the inorganic particle C3 can be more favorably attached to the surface of the starch particle C2, and the inorganic particle C3 can be prevented from reluctantly falling from the surface of the starch particle C2 or from reluctantly being buried inside the starch particle C2. In this regard, since the average particle diameter of the inorganic particle C3 is 1.0 nm or more and 20.0 nm or less, repulsive force is exerted between inorganic particles C3, the composite particle C1 is suppressed from mutually flocculating, and the dispersibility of the composite particle C1 is further improved.

In the binder C10, an inorganic particle C3 which is not attached to a starch particle C2, in other words, an inorganic particle C3 not constituting a composite particle C1, may be contained. However, the proportion of the inorganic particle C3 constituting the composite particle C1 in the inorganic particle C3 contained in the binder C10 is preferably 50% by mass or more, more preferably 60% by mass or more, and further preferably 70% by mass or more. Consequently, the composite particle C1 is suppressed from mutually flocculating, and the dispersibility of the composite particle C1 is further improved.

The inorganic particle C3 has to be mainly composed of an inorganic material. In this regard, all portions of the inorganic particle C3 may have substantially uniform composition, or a portion having a different composition may be included.

Examples of the material constituting the inorganic particle C3 include various metal materials, various metal compounds, various glass materials, and various carbon materials.

Examples of the metal material include simple metals, such as Fe, Al, Cu, Ag, and Ni, and alloys containing at least one of these.

Examples of the metal compound include metal oxides, metal nitrides, metal carbides, and metal sulfides. More specific examples include silica, alumina, zirconia, titanium oxide, magnetite, and ferrite.

Examples of the glass material include soda-lime glass, crystalline glass, quartz glass, lead glass, potassium glass, borosilicate glass, and no-alkali glass.

Examples of the carbon material include diamond, carbon fiber, carbon black, carbon nanotube, carbon nanofiber, and fullerene.

Of these, silica is favorable as the constituent material of the inorganic particle C3. In other words, the inorganic particle C3 is favorably composed of a material containing silica.

Consequently, the dispersibility of the composite particle C1 is further improved. As a result, the binder C10 can be effectively suppressed from reluctantly flocculating during, for example, storage of the binder C10 or transportation of the binder C10 in the production process of the formed body.

The inorganic particle C3 has to be mainly composed of an inorganic material and may include an organic material in addition to the inorganic material.

However, the content of the inorganic material in the base particle of the inorganic particle C3 is preferably 90% by mass or more, more preferably 92% by mass or more, and further preferably 95% by mass or more.

1.2. Formed Body Producing Method

A formed body producing method includes an accumulating step of accumulating a mixture including fiber and starch, a humidifying step of humidifying the accumulated mixture, and a forming step of obtaining a formed body by heating and pressurizing the humidified mixture. In this regard, the gelatinization temperature of the starch is 60° C. or lower.

Consequently, the fiber can be strongly and mutually bound with uniformity throughout the formed body, and the formed body having sufficient strength can be produced. In particular, when the formed body is produced by heating and pressurizing the mixture including the humidified fiber and the starch, the starch functions as a binding material to mutually bind the fiber. At this time, the starch that is gelatinized at 60° C. or lower being used as the binding material enables the fiber to be mutually bound even when heating is performed at a relatively low temperature. As a result, the fiber is suppressed from deteriorating due to excessive heating, and the formed body having sufficient strength can be produced. Further, the starch that is gelatinized at 60° C. or lower being used as the binding material enables the formed body having excellent strength to be produced by strongly and mutually bound the fiber with uniformity throughout the formed body due to gelatinization of the starch while the fiber in a high temperature portion is suppressed from being damaged due to overheating and the temperature of a low temperature portion is increased to the gelatinization temperature even when it is difficult to uniformly heat the mixture of the fiber and the starch that is the precursor of the formed body.

1.2.1. Accumulating Step

In the accumulating step, a mixture containing the binder C10 including the fiber and the starch is accumulated.

There is no particular limitation regarding the mixing ratio of the binder C10 to the fiber in the present step, and the content of the binder C10 in the mixture is preferably 1% by mass or more and 50% by mass or less, more preferably 2% by mass or more and 45% by mass or less, and further preferably 3% by mass or more and 40% by mass or less.

Consequently, the content of the fiber in the finally obtained formed body can be made sufficiently high, and the formed body can have more excellent strength. In addition, the binder C10 can be more smoothly transported in the production process of the formed body.

In the present step, the fiber mixed with the binder C10 may be subjected to humidifying treatment prior to the humidifying step, that is, the step of performing humidifying treatment of the mixture, described later. In this regard, the fiber may be humidified between mixing with the binder C10 and accumulation of the mixture obtained by the mixing.

In the above-described instance, the water content in the fiber subjected to the present step is preferably 0.1% by mass or more and 12.0% by mass or less, more preferably 0.2% by mass or more and 10.0% by mass or less, and further preferably 0.3% by mass or more and 9.0% by mass or less.

Consequently, for example, the fiber can be prevented from being affected by static electricity before the present step. For example, the fiber can be effectively prevented from being attached to the wall surface and the like of a formed body producing apparatus due to static electricity, and the fiber and the binder C10 can be more uniformly mixed.

1.2.2. Humidifying Step

In the humidifying step, the mixture accumulated in the accumulating step, that is, the mixture including the fiber and the binder C10 is humidified.

Consequently, in the forming step described later, the binding strength between the fiber and the binder C10 and the mutual binding strength of the fiber with the binder C10 interposed therebetween can be made excellent, and the strength and the like of the finally obtained formed body can be made sufficiently excellent. In addition, forming in the forming step can be favorably performed under a relatively moderate condition.

There is no particular limitation regarding the method for humidifying the mixture, and it is favorable that humidifying be performed in noncontact with the mixture. Examples of the method include a method in which the mixture is placed in a high humidity atmosphere, a method in which the mixture is passed through a high humidity space, a method in which mist of a liquid containing water is blown to the mixture, and a method in which the mixture is passed through a space including suspended mist of a liquid containing water. A method selected from these may be used, or at least two methods may be used in combination. More specifically, the mixture may be humidified by using various humidifiers and the like of, for example, a vaporizing type or an ultrasonic type. The mixture may be humidified at a plurality of stages in, for example, the formed body producing process. In this regard, for example, a preservative, a fungicide, and an insecticide may be contained in the liquid containing water.

The amount of water provided in the humidifying step is preferably 12% by mass or more and 40% by mass or less, more preferably 15% by mass or more and 40% by mass or less, and further preferably 20% by mass or more and 30% by mass or less relative to the total mass of the mixture.

Consequently, a formed body can be produced by using considerably small amount of water compared with the sheet forming method in the related art. That is, a sheet having excellent strength can be produced while the amount of energy, for example, electricity required for heating and drying the water provided is reduced.

1.2.3. Forming Step

In the forming step, the mixture humidified in the humidifying step is heated and pressurized. Consequently, a formed body is obtained. In this regard, the humidifying step and the forming step may be simultaneously performed.

There is no particular limitation regarding the heating temperature of the mixture in the forming step, and the heating temperature is preferably 60° C. or higher and 200° C. or lower, more preferably 70° C. or higher and 150° C. or lower, and further preferably 80° C. or higher and 120° C. or lower. In the present embodiment, the starch having a gelatinization temperature of 60° C. or lower being used as the binder C10 enables the fiber to be mutually bound strongly and uniformly even at a relatively low heating temperature. As a result, the formed body having sufficient strength can be produced while the fiber is suppressed from deteriorating.

The present step can be performed by using, for example, a heat press or a heat roller.

Consequently, the constituent components of the fiber and the binder C10 can be effectively prevented from, for example, reluctantly deteriorating or denaturing, and wetting and spreading of the binder C10 on the fiber surface can be further facilitated. As a result, the resulting formed body can have more excellent strength and reliability. In this regard, it is favorable from the viewpoint of energy conservation. In addition, gelatinization of the starch contained in the binder C10 can favorably proceed.

Figure 2:
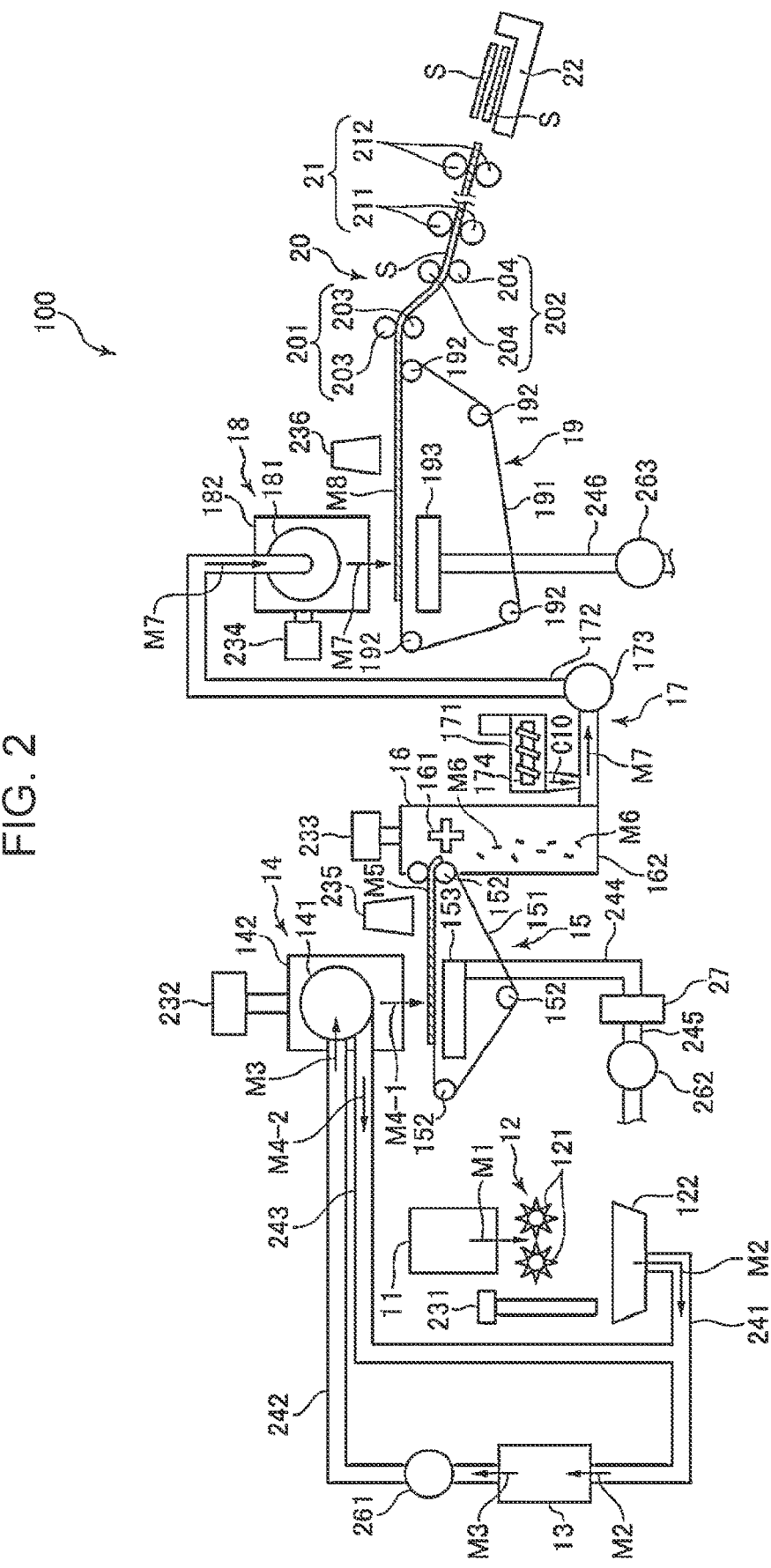
FIG. 2 is a schematic side view illustrating the configuration of a producing apparatus suitable for realizing the formed body producing method.

When the formed body is a sheet-like formed body, as illustrated in FIG. 2, it is favorable that the mixture be heated and pressurized by using a pair of heat rollers 204.

Consequently, when the sheet-like formed body is produced, the mixture of the fiber and the binder C10 can be uniformly heated and pressurized. As a result, in the formed body, the fiber can be mutually bound strongly and uniformly, and the formed body having excellent strength can be produced.

In this regard, it is favorable that the mixture be simultaneously heated and pressurized by using the pair of heat rollers 204. Consequently, a pressurizing roller to pressurize the mixture and a heat roller 204 to heat the mixture are not limited to be separately disposed, and the mixture can be simultaneously heated and pressurized by using only a pair of heat rollers 204. As a result, an entire formed body producing apparatus can be reduced in size. In this regard, from the viewpoint of size reduction of the formed body producing apparatus and the strength of the resulting formed body, it is favorable that before the mixture is pressurized and heated by using the heat rollers 204, a pressure larger than the pressure applied by the heat rollers to the mixture not be applied to the mixture and the mixture not be heated at a temperature higher than the temperature at which the mixture is heated by the heat rollers.

In addition, when the mixture is heated and pressurized by using the pair of heat rollers 204, the surface temperature of the heat rollers 204 is preferably 70° C. or higher and 140° C. or lower, more preferably 80° C. or higher and 130° C. or lower, and further preferably 90° C. or higher and 120° C. or lower. In the present embodiment, the starch having a gelatinization temperature of 60° C. or lower being used as the binder C10 enables the fiber to be mutually bound strongly and uniformly even at a relatively low heating temperature. As a result, the formed body having sufficient strength can be produced while the fiber is suppressed from deteriorating.

In the forming step, the mixture is pressurized at a pressure of preferably 0.1 MPa or more and 100.0 MPa or less, the mixture is pressurized at a pressure of more preferably 0.2 MPa or more and 10.0 MPa or less, and the mixture is pressurized at a pressure of further preferably 0.3 MPa or more and 8.0 MPa or less.

Consequently, wetting and spreading of the binder C10 on the fiber surface can be further facilitated while the fiber is prevented from deteriorating due to pressurization. As a result, the resulting formed body can have more excellent strength.

The formed body producing method described above can be favorably realized by using, for example, a formed body producing apparatus described below.

1.2.4. Formed Body Producing Apparatus

Next, the formed body producing apparatus will be described.

FIG. 2 is a schematic explanatory diagram illustrating the configuration of a producing apparatus suitable for realizing the formed body producing method according to the present embodiment. Hereafter, for the sake of facilitating explanation, the upper side of FIG. 2 is also referred to as "up" or "above", the lower side is also referred to as "down" or "below", the left side is also referred to as "left" or "upstream", and right side is also referred to as "right" or "downstream".

In the following explanation, a sheet producing apparatus 100 that produces a sheet as a formed body will be described as an example of the formed body producing apparatus.

As illustrated in FIG. 2, the sheet producing apparatus 100 serving as a formed body producing apparatus includes a raw material supply portion 11, a coarse crushing portion 12, a defibration portion 13, a sorting portion 14, a first web forming portion 15, a subdivision portion 16, a mixing portion 17, a disentanglement portion 18, a second web forming portion 19, a sheet forming portion 20, a cutting portion 21, and a stock portion 22. In addition, the sheet producing apparatus 100 includes a humidifying portion 231, a humidifying portion 232, a humidifying portion 233, and a humidifying portion 234.

The operation of each portion included in the sheet producing apparatus 100 is controlled by a control portion not illustrated in the drawing.

The configuration of each portion included in the sheet producing apparatus 100 will be described below.

The raw material supply portion 11 is a portion to perform the raw material supply step of supplying a sheet-like material M1 to the coarse crushing portion 12. The sheet-like material M1 is a sheet-like material including a fiber such as a cellulose fiber.

The coarse crushing portion 12 is a portion to perform the coarse crushing step of coarsely crushing the sheet-like material M1 supplied from the raw material supply portion 11 in gas such as air. The coarse crushing portion 12 includes a pair of coarse crushing blades 121 and a hopper 122.

The pair of coarse crushing blades 121 rotating in the directions opposite to each other enables the sheet-like material M1 to be coarsely crushed, that is, cut, between the blades so as to produce coarsely crushed piece M2. It is favorable that the shape and the size of the coarsely crushed piece M2 be suitable for defibration treatment in the defibration portion 13. For example, the coarsely crushed piece M2 is favorably a small piece having a length of a side of 100 mm or less and is more favorably a small piece having a length of a side of 10 mm or more and 70 mm or less.

The hopper 122 is arranged below the pair of coarse crushing blades 121 and has, for example, a funnel-like shape. Consequently, the hopper 122 can receive the coarsely crushed piece M2 that is coarsely crushed by the coarse crushing blades 121 and that falls.

In addition, the humidifying portion 231 adjoining the coarse crushing blades 121 is disposed above the hopper 122. The humidifying portion 231 humidify the coarsely crushed piece M2 in the hopper 122. The humidifying portion 231 includes a filter containing water, not illustrated in the drawing, and is composed of a vaporizing type humidifier which supplies humidified air having humidity increased by passing the air through the filter to the coarsely crushed piece M2. The humidified air being supplied to the coarsely crushed piece M2 enables attachment of the coarsely crushed piece M2 to the hopper 122 and the like due to static electricity to be controlled.

The hopper 122 is coupled to the defibration portion 13 through a pipe 241 serving as a flow passage. The coarsely crushed piece M2 collected in the hopper 122 is transported to the defibration portion 13 through the pipe 241.

The defibration portion 13 is a portion to perform defibration step of defibering the coarsely crushed piece M2 in gas such as air or the like, that is, in a dry system. A defibered material M3 can be produced from the coarsely crushed piece M2 by the defibration treatment in the defibration portion 13. Herein, "defiber" denotes the coarsely crushed piece M2 in which a plurality of fibers are bound being disentangled into individual fibers. The disentangled material is the defibered material M3. The shape of the defibered material M3 is linear or band-like. In this regard, the defibered materials M3 may be present in a mutually entangled cluster state, that is, in a state of forming a so-called "lump".

For example, in the present embodiment, the defibration portion 13 is composed of an impeller mill having a rotor which rotates at a high speed and a liner located at an outer circumference of the rotor. The coarsely crushed piece M2 that flows into the defibration portion 13 is defibered by being pinched in between the rotor and the liner.

In addition, the defibration portion 13 can generate a stream of air, that is, a gas stream, from the coarse crushing portion 12 toward the sorting portion 14 due to the rotation of the rotor. Consequently, the coarsely crushed piece M2 can be suctioned from the pipe 241 to the defibration portion 13. In this regard, after defibration treatment, the defibered material M3 can be sent to the sorting portion 14 through a pipe 242.

A blower 261 is disposed in midstream of the pipe 242. The blower 261 is a gas stream generator to generate a gas stream toward the sorting portion 14. Consequently, sending of the defibered material M3 to the sorting portion 14 is facilitated.

The sorting portion 14 is a portion to perform the sorting step of sorting the defibered material M3 based on the length of the fiber. In the sorting portion 14, the defibered material M3 is sorted into a first sorted material M4-1 and a second sorted material M4-2 larger than the first sorted material M4-1. The first sorted material M4-1 has a size suitable for producing sheet S thereafter. The second sorted material M4-2 includes, for example, an insufficiently defibered material and a material formed of fiber defibered and excessively mutually flocculated.

The sorting portion 14 includes a drum portion 141 and a housing portion 142 to house the drum portion 141.

The drum portion 141 is a sieve composed of a cylindrical net body that rotates about the center axis thereof. The defibered material M3 flows into the drum portion 141. The defibered material M3 smaller than the opening of the net is sorted as the first sorted material M4-1, and the defibered material M3 larger than the opening of the net is sorted as the second sorted material M4-2 due to the drum portion 141 rotating.

The first sorted material M4-1 falls from the drum portion 141.

The second sorted material M4-2 is sent to a pipe 243 serving as a flow passage coupled to the drum portion 141. An end of the pipe 243 opposite to the drum portion 141, that is, on the upstream, is coupled to the pipe 241. The second sorted material M4-2 passed through the pipe 243 is merged with the coarsely crushed piece M2 in the pipe 241 and flows into the defibration portion 13 with the coarsely crushed piece M2. Consequently, the second sorted material M4-2 is returned to the defibration portion 13 and subjected to the defibration treatment with the coarsely crushed piece M2.

In this regard, the first sorted material M4-1 from the drum portion 141 is dispersed in air and falls toward the first web forming portion 15 serving as a separating portion located below the drum portion 141. The first web forming portion 15 is a portion to perform the first web forming step of forming a first web M5 from the first sorted material M4-1. The first web forming portion 15 includes a mesh belt 151 serving as a separating belt, three stretching rollers 152, and a suction portion 153.

The mesh belt 151 is an endless belt on which the first sorted material M4-1 is accumulated. The mesh belt 151 is looped over the three stretching rollers 152. In this regard, the first sorted material M4-1 on the mesh belt 151 is transported to the downstream due to the stretching rollers 152 being driven to rotate.

The first sorted material M4-1 is larger than the opening of the mesh belt 151. Consequently, passing of the first sorted material M4-1 through the mesh belt 151 is restricted, and the first sorted material M4-1 can be accumulated on the mesh belt 151. In this regard, since the first sorted material M4-1 is accumulated on the mesh belt 151 and is transported to the downstream with the mesh belt 151, a layered first web M5 is formed.

In addition, for example, dust and dirt may be included in the first sorted material M4-1. For example, dust and dirt may be included with the sheet-like material M1 when the sheet-like material M1 is supplied from the raw material supply portion 11 to the coarse crushing portion 12. The dust and the dirt are smaller than the opening of the mesh belt 151. Consequently, the dust and the dirt pass through the mesh belt 151 and further fall downward.

The suction portion 153 can suction air from below the mesh belt 151. Consequently, the dust and the dirt passed through the mesh belt 151 can be suctioned with air.

The suction portion 153 is coupled to a recovery portion 27 through a pipe 244 serving as a flow passage. The dust and the dirt suctioned in the suction portion 153 are recovered into the recovery portion 27.

The recovery portion 27 is further coupled to a pipe 245 serving as a flow passage. In addition, a blower 262 is disposed in midstream of the pipe 245. Suction force can be generated in the suction portion 153 by operating the blower 262. Consequently, formation of the first web M5 on the mesh belt 151 is facilitated. The dust and the dirt are removed from the first web M5. In this regard, the dust and the dirt pass through the pipe 244 and reach the recovery portion 27 due to the blower 262 being operated.

The housing portion 142 is coupled to the humidifying portion 232. The humidifying portion 232 is composed of a vaporizing type humidifier akin to that in the humidifying portion 231. Consequently, humidified air is supplied into the housing portion 142. The first sorted material M4-1 can be humidified by the humidified air, and, therefore, the first sorted material M4-1 can also be suppressed from being attached to the inner wall of the housing portion 142 due to electrostatic force.

A humidifying portion 235 is disposed downstream from the sorting portion 14. The humidifying portion 235 is composed of an ultrasonic humidifier that sprays water. Consequently, water can be supplied to the first web M5, and the amount of water of the first web M5 can be adjusted. This water adjustment can suppress the first web M5 from adsorbing to the mesh belt 151 due to electrostatic force. As a result, the first web M5 is readily peeled from the mesh belt 151 at the position at which the mesh belt 151 is folded back by the stretching roller 152.

The subdivision portion 16 is disposed downstream from the humidifying portion 235. The subdivision portion 16 is a portion to perform the cutting step of cutting the first web M5 peeled from the mesh belt 151. The subdivision portion 16 includes a rotatively supported propeller 161 and a housing portion 162 to house the propeller 161. In this regard, the first web M5 being caught in the rotating propeller 161 enables the first web M5 to be cut. The resulting first web M5 serves as a subdivided body M6. The subdivided body M6 falls in the housing portion 162.

The housing portion 162 is coupled to the humidifying portion 233. The humidifying portion 233 is composed of a vaporizing type humidifier akin to that in the humidifying portion 231. Consequently, humidified air is supplied into the housing portion 162. The humidified air can also suppress the subdivided body M6 from being attached to the propeller 161 and the inner wall of the housing portion 162 due to electrostatic force.

The mixing portion 17 is disposed downstream from the subdivision portion 16. The mixing portion 17 is a portion to perform the mixing step of mixing the subdivided body M6 with the binder C10. The mixing portion 17 includes a binder supply portion 171, a pipe 172 serving as a flow passage, and a blower 173.

The pipe 172 couples the housing portion 162 of the subdivision portion 16 to the housing portion 182 of the disentanglement portion 18 and is a flow passage through which a mixture M7 of the subdivided body M6 and the binder C10 passes.

A binder supply portion 171 is disposed in midstream of the pipe 172. The binder supply portion 171 includes a screw feeder 174. The screw feeder 174 being driven to rotate enables the binder C10 to be supplied to the pipe 172. The binder C10 supplied to the pipe 172 is mixed with the subdivided body M6 so as to form the mixture M7.

In this regard, in the binder C10 from the binder supply portion 171, for example, a coloring agent to color the fiber, a flocculation inhibitor to suppress the fiber from being flocculated and to suppress the binder C10 from being flocculated, and a flame retardant to suppress the fiber and the like from readily burning may be contained.

A blower 173 is disposed in midstream of the pipe 172 and downstream from the binder supply portion 171. The blower 173 can generate a gas stream toward the disentanglement portion 18. The resulting gas stream can agitate the subdivided body M6 and the binder C10 in the pipe 172. Consequently, the mixture M7 in the state in which the subdivided body M6 and the binder C10 are uniformly dispersed can flow into the disentanglement portion 18. In this regard, the subdivided body M6 in the mixture M7 is disentangled during passing through the pipe 172 so as to take on a finer fiber state.

The disentanglement portion 18 is a portion to perform the disentanglement step of disentangling mutually entangled fiber in the mixture M7. The disentanglement portion 18 includes a drum portion 181 and a housing portion 182 to house the drum portion 181.

The drum portion 181 is a sieve composed of a cylindrical net body that rotates about the center axis thereof. The mixture M7 flows into the drum portion 181. The fiber and the like, in the mixture M7, smaller than the opening of the net can pass through the drum portion 181 due to the drum portion 181 rotating. At this time, the mixture M7 is disentangled.

The housing portion 182 is coupled to the humidifying portion 234. The humidifying portion 234 is composed of a vaporizing type humidifier akin to that in the humidifying portion 231. Consequently, humidified air is supplied into the housing portion 182. The humidified air can humidify inside the housing portion 182 and, thereby, can also suppress the mixture M7 from being attached to the inner wall of the housing portion 182 due to electrostatic force.

The mixture M7 disentangled in the drum portion 181 is dispersed in air and falls toward the second web forming portion 19 located below the drum portion 181. The second web forming portion 19 is a portion to perform the second web forming step of forming a second web M8 from the mixture M7. The second web forming step in the present embodiment is the accumulating step of accumulating the mixture containing the fiber and the binder C10 in air. The second web forming portion 19 includes a mesh belt 191 serving as a separating belt, stretching rollers 192, and a suction portion 193.

The mesh belt 191 is an endless belt on which the mixture M7 is accumulated. The mesh belt 191 is looped over four stretching rollers 192. In this regard, the mixture M7 on the mesh belt 191 is transported to the downstream due to the stretching rollers 192 being driven to rotate.

In this regard, most of the mixture M7 on the mesh belt 191 is larger than the opening of the mesh belt 191. Consequently, passing of the mixture M7 through the mesh belt 191 is restricted, and the mixture M7 can be accumulated on the mesh belt 191. In addition, since the mixture M7 is accumulated on the mesh belt 191 and is transported to the downstream with the mesh belt 191, a layered second web M8 is formed.

The suction portion 193 can suction air from below the mesh belt 191. Consequently, the mixture M7 can be suctioned on the mesh belt 191, and accumulation of the mixture M7 on the mesh belt 191 is thereby facilitated.

A pipe 246 serving as a flow passage is coupled to the suctioning portion 193. In addition, a blower 263 is disposed in midstream of the pipe 246. Suction force can be generated in the suction portion 193 by operating the blower 263.

A humidifying portion 236 is disposed downstream from the disentanglement portion 18. The humidifying portion 236 is a portion to perform the humidifying step. The humidifying portion 236 is composed of an ultrasonic humidifier akin to that in the humidifying portion 235. Consequently, water can be supplied to the second web M8, and, therefore, the amount of water of the second web M8 can be adjusted. This water adjustment enables binding force between the fiber and the binder C10 in a sheet S, which is a finally obtained formed body, to become favorable.

In addition, humidification enables the second web M8 to be suppressed from adsorbing to the mesh belt 191 due to electrostatic force. Consequently, the second web M8 is readily peeled from the mesh belt 191 at the position at which the mesh belt 191 is folded back by the stretching roller 192.

The sheet forming portion 20 is disposed downstream from the second web forming portion 19. The sheet forming portion 20 is a portion to perform the sheet forming step that is the forming step of forming the sheet S from the second web M8. The sheet forming portion 20 includes a pressurizing portion 201 and a heating portion 202.

The pressurizing portion 201 includes a pair of calender rollers 203, and the second web M8 can be pressurized between these rollers. Consequently, the density of the second web M8 is increased. Subsequently, the second web M8 is transported toward the heating portion 202. In this regard, one of the pair of calender rollers 203 is a main driving roller that is driven due to operation of a motor not illustrated in the drawing, and the other is a driven roller.

The heating portion 202 includes a pair of heat rollers 204. The second web M8 can be heated and pressurized by being passed between the pair of heat rollers 204. In the second web M8, the binder C10 is melted due to the heating and pressurization by using the pair of heat rollers 204, and the fiber is mutually bound with the molten binder C10 interposed therebetween. Consequently, the sheet S that is a formed body is formed. The second web M8 being heated by using the pair of heat rollers 204 enables the second web M8 to be uniformly heated and pressurized and enables the sheet S having excellent strength to be produced.

The surface temperature of the heat rollers 204 is preferably 70° C. or higher and 140° C. or lower. Consequently, the fiber can be mutually bound strongly and uniformly at a relatively low heating temperature. As a result, the formed body having sufficient strength can be produced while the fiber is suppressed from deteriorating.

The heat rollers 204 preferably pressurize the second web M8 at a pressure of 0.1 MPa or more and 100.0 MPa or less, more preferably pressurize the second web M8 at a pressure of 0.2 MPa or more and 10.0 MPa or less, and further preferably pressurize the second web M8 at a pressure of 0.3 MPa or more and 8.0 MPa or less.

Consequently, wetting and spreading of the binder C10 on the fiber surface can be further facilitated. As a result, the resulting formed body can have more excellent strength.

In this regard, one of the pair of heat rollers 204 is a main driving roller that is driven due to operation of a motor not illustrated in the drawing, and the other is a driven roller.

The cutting portion 21 is disposed downstream from the sheet forming portion 20. The cutting portion 21 is a portion to perform the cutting step of cutting the sheet S. The cutting portion 21 includes a first cutter 211 and a second cutter 212.

The first cutter 211 cuts the sheet in the direction intersecting the transportation direction of the sheet S.

The second cutter 212 cuts the sheet S in the transportation direction of the sheet S in the downstream from the first cutter 211.

The sheet S that is a formed body having a predetermined size is obtained due to such cutting by using the first cutter 211 and the second cutter 212. Subsequently, the resulting sheet S is further transported to the downstream and is accumulated in the stock portion 22.

1.3. Formed Body

Next, the formed body will be described.

The formed body is produced by using the above-described formed body producing method. Consequently, the formed body having excellent strength can be provided.

It is favorable that the fiber contained in the formed body and the binder C10 containing the starch satisfy the respective conditions akin to those described above.

There is no particular limitation regarding the shape of the formed body, and any shape, such as a sheet-like shape, a block-like shape, a spherical shape, or a three-dimensional solid shape, may be adopted. The formed body according to the present embodiment has favorably a sheet-like shape. In this regard, "sheet-like shape" denotes a formed body configured to have a thickness of 30 μm or more and 30 mm or less and a density of 0.05 g/cm$^3$ or more and 1.50 g/cm$^3$ or less.

Consequently, for example, the formed body can be favorably used as a recording medium and the like. In addition, the above-described apparatus being used enables the production to be performed more efficiently.

When the formed body according to the present disclosure is a sheet-like recording medium, the thickness is preferably 30 μm or more and 30 mm or less.

Consequently, the formed body can be more favorably used as the recording medium. In addition, the above-described apparatus being used enables the production to be performed more efficiently.

In the instance of the sheet-like recording medium, the density is preferably 0.6 g/cm$^3$ or more and 0.9 g/cm$^3$ or less. Consequently, the formed body can be more favorably used as the recording medium.

At least a portion of the formed body has to be produced by adopting the above-described formed body producing method, and the formed body may include other portions. In this regard, after the steps described in "Formed body producing method", the formed body may be subjected to downstream steps.

There is no particular limitation regarding the application of the formed body, and examples include recording media, liquid absorbers, buffering materials, and acoustic insulating materials.

The favorable embodiments are as described above, but the present disclosure is not limited to these.

For example, in the above-described embodiment, the description is centering on the instance of the binder C10 including the composite particle C1 in which the inorganic particle C3 is attached to the surface of the starch particle C2. However, the binder C10 is not limited to including the above-described composite particle C1 provided that the starch is contained. The description is centering on the form in which the starch is the starch particle C2. However, the starch particle C2 is not limited to being included provided that the starch is contained.

Further, each portion constituting the sheet producing apparatus 100 can be substituted with any configuration that can perform the same function. In this regard, any configuration may be added.

2. EXAMPLES

Next, the examples according to the present disclosure will be described.

2.1. Preparation of Binder

2.1.1. Preparation of Raw Material Starches 1 to 5

A starch having a weight average molecular weight of 1,300,000 (G-800 produced by NIPPON STARCH CHEMICAL CO., LTD.) was suspended in water. Thereafter, sulfuric acid was made to act under the condition at which the starch was not gelatinized, sufficient mixing was performed, and agitation was performed for 12 hours. After the water content was set to be 10% by mass or less by performing drying at 50° C. for 24 hours, heating was performed at 120° C. to 180° C. so as to obtain a paste-like starch. Subsequently, the paste-like starch was washed with water, freeze-dried, and coarsely crushed so as to obtain raw material starch 1 having a weight average molecular weight of 100,000. The gelatinization temperature of raw material starch 1 was 51° C. In addition, raw material starch 2 (gelatinization temperature of 42° C.), raw material starch 3 (gelatinization temperature of 57° C.), raw material starch 4 (gelatinization temperature of 34° C.), and raw material starch 5 (gelatinization temperature of 68° C.) were obtained by the treatment akin to that in production of raw material starch 1 except that the treatment conditions (sulfuric acid concentration and agitation time) for the starch having a weight average molecular weight of 1,300,000 (G-800 produced by NIPPON STARCH CHEMICAL CO., LTD.) were changed.

2.1.2. Preparation of Starch Particles 1-1 to 1-3, 2-1, 3-1, 4-1, and 5-1

Raw material starch 1 was crushed by using a fluidized-bed type opposed jet mill (Counter Jet Mill AFG-R produced by Hosokawa Micron Corporation) at a treatment pressure of 4 bar so as to obtain starch particle 1-1 having an average particle diameter of 10 μm as a starch particle C2. In addition, raw material starches 2 to 5 were subjected to the treatment akin to that applied to the raw material starch 1 so as to obtain starch particles 2-1, 3-1, 4-1, and 5-1, respectively. Further, raw material starch 1 was subjected to the treatment akin to that applied when starch particle 1 was produced except that the treatment pressure during crushing was changed so as to obtain starch particle 1-2 having an average particle diameter of 4 μm (treatment pressure of 6 bar) and starch particle 1-3 having an average particle diameter of 20 μm (treatment pressure of 2 bar).

2.1.3. Preparation of Composite Particle

Preparation Example 1

A Henschel mixer (FM Mixer FM 20C/I produced by NIPPON COKE & ENGINEERING CO., LTD.) was charged with 99 parts by mass of starch particle 1-1 and 1 part by mass of fumed silica (HM-30S produced by Tokuyama Corporation) serving as the inorganic particle C3, and mixing treatment was performed at a frequency of 60 Hz for 10 minutes. Thereafter, sifting treatment was performed by using a sieve with an opening of 30 μm so as to prepare a binder C10 of preparation example 1 including the composite particle C1 in which starch particle C2 and fumed silica serving as the inorganic particle C3 were integrated.

Preparation Examples 2 to 7

Binders C10 were prepared in the manner akin to that in preparation example 1 except that the starch particle C2 and the inorganic particle C3 had the configuration described in Table 1.

TABLE 1

| | | Starch particle | | | Inorganic particle | |
|---|---|---|---|---|---|---|
| | Type | Gelatinization temperature [° C.] | Average particle diameter [μm] | Content [% by mass] | Type | Average particle diameter [nm] | Content [% by mass] |
| Preparation example 1 | starch particle 1-1 | 51 | 10.0 | 99.0 | HM-30S | 7.0 | 1.0 |
| Preparation example 2 | starch particle 2-1 | 42 | 10.0 | 99.0 | HM-30S | 7.0 | 1.0 |
| Preparation example 3 | starch particle 3-1 | 57 | 10.0 | 99.0 | HM-30S | 7.0 | 1.0 |
| Preparation example 4 | starch particle 1-2 | 51 | 3.0 | 99.0 | HM-30S | 7.0 | 1.0 |
| Preparation example 5 | starch particle 1-3 | 51 | 20.0 | 99.0 | HM-30S | 7.0 | 1.0 |
| Preparation example 6 | starch particle 4-1 | 34 | 10.0 | 99.0 | HM-30S | 7.0 | 1.0 |
| Preparation example 7 | starch particle 5-1 | 68 | 10.0 | 99.0 | HM-30S | 7.0 | 1.0 |

2.1.4. Production of Sheet Serving as Formed Body

Example 1

In the present example, the sheet serving as the formed body was produced by using the binder C10 of preparation example 1 above.

A modified machine which was a modified sheet producing apparatus 100 (PaperLab (registered trademark) A-8000 produced by Seiko Epson Corporation) capable of humidifying a sheet after forming and before pressurization was prepared, and a sheet-like material M1 which was commercially available copy paper (GR70-W produced by Fuji Xerox Co., Ltd.) printed with a business document by using an ink jet printer was used as a fiber source.

Subsequently, the sheet-like material M1 above was supplied to the raw material supply portion 11 of the sheet producing apparatus 100, the binder produced in preparation example 1 of the binder was supplied to the binder supply portion 171, and the sheet producing apparatus 100 was operated so as to produce an A4-sized sheet serving as a formed body by applying treatments of a coarse crushing step, a defibration step, a sorting step, a first web forming step, a subdivision step, a mixing step, a disentanglement step, a second web forming step serving as an accumulating step, a humidifying step, a sheet forming step serving as a forming step, and a cutting step. The basis weight of the resulting sheet was 90 g/m².

At this time, it was adjusted that the raw material of the sheet which was a finally obtained formed body contained 10 parts by mass of binder C10 relative to 90 parts by mass of the fiber. In addition, regarding the condition during heating and pressurization in the forming step, the temperature of the heat rollers 204 was set to be 110° C., the pressure was set to be 70 MPa, and the heating and pressurization time was set to be 15 seconds.

Examples 2 to 10 and Comparative Example 1

A4-sized sheets serving as formed bodies were produced in the manner akin to that in example 1 above except that the materials described in Table 2 were used as the binder C10 and that the formed bodies were produced under the condition described as the forming condition in Table 2.

2.2. Evaluation

2.2.1. Strength of Formed Body

Strips of 100 mm×20 mm were cut from the sheets serving as the formed bodies produced in the above-described examples and the comparative example, and the breaking strength in the longitudinal direction of the strip was measured. Autograph AGS-1N produced by SHIMADZU CORPORATION was used for measuring the breaking strength, the breaking strength was measured at a pulling rate of 20 mm/sec, the specific tearing strength was calculated therefrom, and evaluation was performed in accordance with the following criteria. It can be said that larger specific tearing strength corresponds to more excellent strength.

A: the specific tearing strength is 25 Nm/g or more
B: the specific tearing strength is 20 Nm/g or more and less than 25 Nm/g
C: the specific tearing strength is 15 Nm/g or more and less than 20 Nm/g
D: the specific tearing strength is 10 Nm/g or more and less than 15 Nm/g
E: the specific tearing strength is less than 10 Nm/g The results are described in Table 2.

TABLE 2

| | | Forming condition | | |
|---|---|---|---|---|
| | Binder | Heat roller temperature [° C.] | Amount of water humidified [% by mass] | Specific tearing strength |
| Example 1 | preparation example 1 | 110 | 20 | B |
| Example 2 | preparation example 1 | 80 | 20 | D |
| Example 3 | preparation example 1 | 150 | 20 | C |
| Example 4 | preparation example 1 | 110 | 10 | D |
| Example 5 | preparation example 1 | 110 | 50 | D |
| Example 6 | preparation example 2 | 110 | 20 | C |
| Example 7 | preparation example 3 | 110 | 20 | B |
| Example 8 | preparation example 4 | 110 | 20 | A |
| Example 9 | preparation example 5 | 110 | 20 | D |
| Example 10 | preparation example 6 | 110 | 20 | D |
| Comparative example 1 | preparation example 7 | 110 | 20 | E |

As is clear from Table 2, regarding examples 1 to 10 in which formed bodies were produced by using the formed body producing method according to the present disclosure, the specific tearing strength of the resulting formed bodies were rated as D or better, and excellent results were obtained. On the other hand, regarding comparative example 1 in which the starch having the gelatinization temperature out of the range specified in the present disclosure was used, a satisfactory result was not obtained.

Regarding example 10, the strength of the resulting formed body was low compared with that in example 1 and the like in which sheets were produced under the same forming condition. The reason for this is conjectured that since the binder of preparation example 6 used in example 10 had higher water absorbency than the binder of preparation example 1 used in example 1 or the like, the starch was gelatinized in the flow passage to supply the binder in the formed body producing apparatus, and transportability of the binder deteriorated.

What is claimed is:

1. A formed body producing method comprising:
   an accumulating step of accumulating a mixture including fiber and starch,
   a humidifying step of providing the accumulated mixture with water, and
   a forming step of obtaining a formed body by heating and pressurizing the mixture provided with water, wherein
   a gelatinization temperature of the starch is 60° C. or lower.

2. The formed body producing method according to claim 1, wherein
   a heating temperature of the mixture in the forming step is 60° C. or higher and 200° C. or lower.

3. The formed body producing method according to claim 1, wherein
   in the forming step, the mixture is heated and pressurized by using a pair of heat rollers.

4. The formed body producing method according to claim 2, wherein
   in the forming step, the mixture is pressurized at a pressure of 0.2 MPa or more and 10.0 MPa or less.

5. The formed body producing method according to claim 1, wherein
   the gelatinization temperature of the starch is 30° C. or higher.

6. The formed body producing method according to claim 1, wherein
   the amount of water provided in the humidifying step is 12% by mass or more and 40% by mass or less relative to a total mass of the mixture.

7. The formed body producing method according to claim 1, wherein
   the starch is a particle having an average particle diameter of 1.0 μm or more and 30.0 μm or less.

* * * * *